Patented May 15, 1951

2,553,495

UNITED STATES PATENT OFFICE 2,553,495

N-(3-BENZOTHENYL)-N-ETHYL-BETA-CHLOROETHYLAMINE ADRENOLYTIC

Souren Avakian, Oreland, and Gustav J. Martin, Philadelphia, Pa., assignors to The National Drug Company, Philadelphia, Pa., a corporation of Pennsylvania No Drawing. Application May 4, 1950, Serial No. 160,106

2 Claims. (Cl. 260—330.5)

This invention relates to pharmaceuticals, more particularly to pharmaceuticals having unexpectedly desirable properties.

Among the objects of the present invention is the provision of novel pharmaceuticals.

Further objects of the present invention include the provision of novel pharmaceuticals having a strong adrenolytic effect.

The above as well as still further objects of the invention will be more fully understood by the following description of some of its exemplifications.

It has been discovered that N-(3-benzothenyl)-N-(ethyl)-betachloroethylamine as well as its salts such as the hydrochloride, have a pronounced ability to reverse the effect of adrenalin or epinephrine on the human body. The new pharmaceuticals can be administered orally, intramuscularly or intravenously, in the form of undissolved solid or as a solution, in water for example. The dosage depends primarily on the desires of the attending physician but is generally about 0.1 to 1 gram, or from 2 to 20 milligrams per kilogram of body weight.

Actual clinical tests have shown that the new pharmaceuticals when injected intramuscularly as a 1% water solution in an amount of 5 milligrams per kilogram of body weight shows in all cases a complete reversal of the pressor effect (increase in blood pressure) resulting from the prior administration of 10 micrograms of epinephrine.

Dibenamine hydrochloride (N,N-dibenzyl-B-chloroethylamine), which has heretofore been used as a standard adrenolytic agent, shows only about a 75% pressor reversal under the same conditions. Additionally the effect of dibenamine hydrochloride is terminated after 30 minutes, whereas the pharmaceuticals of the invention have an effect that persists generally for several hours, and in some cases for as much as two days. With both types of agents however, the adrenolytic effect appears about ten minutes after administration, regardless of the type of administration used.

N-(3-benzothenyl)-N-(ethyl)-betachloroethylamine hydrochloride was prepared in the following manner:

1. 3-benzothenyl chloride

Sixty-seven grams (g.) of benzothiophene was added to a solution of 22 g. trioxymethylene and 26 g. of dry HCl dissolved in 550 cubic centimeters (cc.) of acetic acid, and the mixture allowed to stand at 0° C. for sixteen hours. The solution was then diluted with 2 liters of water, and extracted with 250 cc. ether. The resulting ether solution was washed first with water and then with a water solution of sodium carbonate, after which it was distilled under reduced pressure. Fifty-two g. of 3-benzothenyl chloride distilled over at 130–132° C. under a pressure of 1 millimeter of mercury.

The reaction can be represented as

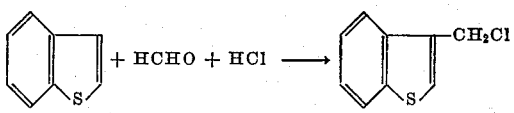

2. N-(3-benzothenyl)-N-(ethyl)-betahydroxyethylamine hydrochloride

A solution of 18 g. of the above 3-benzothenyl chloride and 18 g. of N-ethyl-ethanolamine in 150 cc. of benzene was refluxed on a steam bath for 5 hours. The mixture was then cooled to room temperature and filtered, the filtrate washed with a little water and distilled under reduced pressure. At 185–189° C. and under a pressure of 2 millimeters of mercury, 15 g. of N(3-benzothenyl)-N-ethyl-betahydroxyethylamine hydrochloride, melting at 129–130° C. were recovered.

This reaction is:

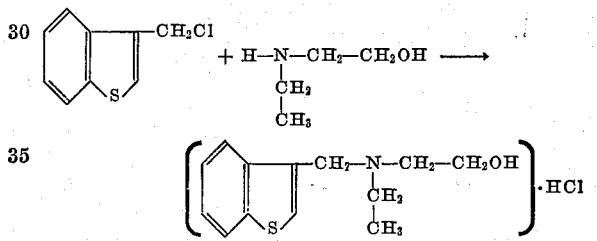

3. N-(3-benzothenyl)-N-(ethyl)-betachloroethylamine hydrochloride

Fourteen grams of the above N-(3-benzothenyl)-N-(ethyl)-betahydroxyethylamine hydrochloride was refluxed with 15 cc. of thionyl chloride in 100 cc. of chloroform for half an hour. Most of the solvent was then distilled off, and the residue dissolved in 30 cc. of hot isopropyl alcohol. On cooling the resulting solution to 0° C., 12 g. of N(3-benzothenyl)-N-ethyl-betachloroethylamino hydrochloride, melting at 147–148° C., precipitated, and was filtered off. Two successive analyses showed the precipitate to have 4.85 and 4.78% nitrogen respectively. The theoretical nitrogen content based on the expected formula, is 4.82%.

The reaction at this step is:

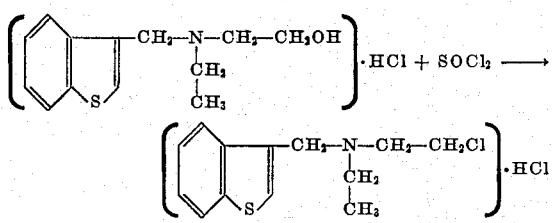

The final hydrochloride can be readily converted to the free amine by merely neutralizing it with an alkali such as sodium hydroxide, carbonate or bicarbonate. The free amine can be separated from the accompanying chloride salts as by extracting the neutralized mixture with ether or chloroform, and then evaporating off the extracting solvent. Other salts, such as the hydrobromide, sulfate, phosphate, or salts of organic acids are conveniently formed by mixing the free base with the corresponding acid in the stoichiometric proportions.

As many apparently widely different embodiments of this invention may be made without departing from the spirit and scope hereof, it is to be understood that the invention is not limited to the specific embodiments hereof except as defined in the appended claims.

What is claimed is:

1. An adrenolytic agent of the class consisting of N-(3-benzothenyl)-N-(ethyl)-betachloroethylamine and its salts.

2. N-(3-benzothenyl) - N - (ethyl)-betachloroethylamine hydrochloride.

SOUREN AVAKIAN.
GUSTAV J. MARTIN.

REFERENCES CITED

The following references are of record in the file of this patent:

UNITED STATES PATENTS

| Number | Name | Date |
|---|---|---|
| 2,517,826 | Avakian | Aug. 8, 1950 |